Jan. 19, 1960    H. S. JOHNSON ET AL    2,921,840
PROCESS FOR PREPARATION OF CARBON MONOXIDE
Filed Nov. 9, 1956
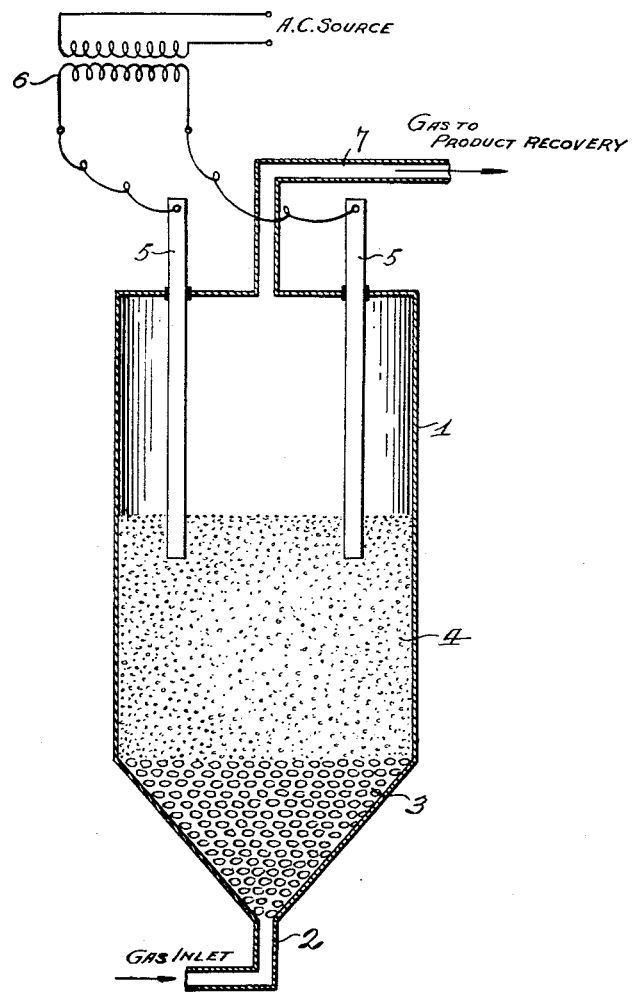
INVENTORS
HERBERT S. JOHNSON
ARTHUR H. ANDERSEN
BY D.R. Morrison
AGENT

2,921,840

PROCESS FOR PREPARATION OF CARBON MONOXIDE

Herbert S. Johnson, Shawinigan Falls, Quebec, and Arthur H. Andersen, Mount Royal, Quebec, Canada, assignors to Shawinigan Chemicals Limited, Montreal, Quebec, Canada, a corporation of Canada Application November 9, 1956, Serial No. 621,470

1 Claim. (Cl. 23—204)

This invention relates to the preparation of carbon monoxide by reaction of carbon dioxide with carbon.

The chemical reaction involved has been the subject of many investigations, a recent one being reported by S. Ergun in J. Phys. Chem. 60, 480 (1956). Ergun passed carbon dioxide upwardly through a bed of carbon particles in a reaction tube to form a fluidized bed of carbon, and supplied the endothermic heat of reaction by surrounding the fluidized bed with an electric furnace which heated the fluidized bed through the wall of the tube. Stalhed et al., in U.S.P. 2,607,667, described the process in which they passed carbon dioxide through a slowly descending packed bed of carbon and supplied the endothermic heat of reaction by passing electric current through the carbon between electrodes penetrating the bed.

The externally heated fluidized bed process is highly inefficient in requiring heat to be transferred through a wall to the reaction, and the packed bed process is inefficient due to gas channeling, electric current channeling, and other difficulties (Stalhed, "Stahl and Eisen," page 459 (1954)).

It is an object of this invention to provide a fluidized bed process for reacting carbon dioxide with carbon to form carbon monoxide, in which process the endothermic heat of reaction is generated in the fluidized bed.

It has been observed that it is possible to conduct an electric current through a fluidized bed of carbon particles and to generate sufficient heat in the fluidized bed by the passage of the electric current to supply endothermic heat of reaction and also, if desired, to raise the temperature of the bed to a very high degree, for example to red heat. This invention comprises a process for the preparation of carbon monoxide comprising passing a stream of carbon dioxide gas upwardly through a bed comprising finely divided electrically conductive carbon particles, maintaining the particles of the bed in a fluidized state by the passage of the said gas and the products of its reaction with the carbon upwardly therethrough, passing an electric current through the resulting fluidized bed with sufficient power to maintain it at a temperature which sustains a reaction between the carbon dioxide and the carbon particles, and recovering carbon monoxide coming off the fluidized bed. The carbon monoxide coming off the fluidized bed can be recovered by any suitable method or means known in the art, and can be utilized, separated, or stored as required.

The accompanying drawing is a diagrammatic sketch showing, partly in cross-section, a typical simple apparatus suitable for carrying out the process of the invention. In the drawing, 1 represents a chamber designed to contain a bed of fluidized solids at high temperature. Gas to fluidize the solids enters the chamber at inlet 2. Means to distribute the gas over the cross-section of the chamber is shown as a bed of coarse particles 3. The finely divided carbon particles forming the fluidized bed are shown as 4. Electrodes 5, designed to supply current through the fluidized bed are shown partly immersed in the bed. A.C. voltage is applied to the electrodes by transformer 6, and gases coming off the fluidized bed leave the chamber through outlet 7. Alternatively, power can be supplied as direct current.

The chemical reaction taking place in the process of the invention is an equilibrium reaction, and the equilibrium is shifted in the direction of increasing conversion of carbon dioxide to carbon monoxide by increasing reaction temperatures. Hence it is desirable to carry out the process of the invention at a temperature which provides the optimum economic balance between conversion and power consumption. Some reaction can occur at temperatures as low as 600° C. and essentially complete conversion of carbon dioxide to carbon monoxide can theoretically occur above about 1200° C.

An important factor affecting the completeness of conversion of carbon dioxide to carbon monoxide in the process of this invention is the time of contact of the carbon dioxide with carbon particles in the fluidized bed. Reaction can occur only during the period of contact in the bed, i.e. while the gases are in the bed. At 800° C., contact times as low as 0.5 second provide some conversion, but contact times greater than 1 second are preferred to obtain conversions over 50%. At appropriate temperatures, high conversions of almost 100% can be obtained with contact times no greater than 4 seconds, for example slightly over 3 seconds. Contact times longer than that required to reach equilibrium conditions are unnecessary of course. Contact times can be varied and adjusted by varying the rate of flow of carbon dioxide into the fluidized bed of carbon particles, and by varying the depth of the bed of carbon particles. Increasing the rate of flow of carbon dioxide will decrease the contact time in any given bed, and increasing the depth of the bed will increase the contact time of gas passing at any specific linear flow rate.

Another factor affecting the completeness of conversion of carbon dioxide under any particular conditions outlined above is the use of catalysts. There are a number of known catalysts for the chemical reaction taking place, for example alkali hydroxides and alkali carbonates, and these catalysts are effective in increasing the rate of reaction in the present invention. The catalyst is conveniently utilized by impregnating the carbon particles of the fluidized bed with it, for example by use of an aqueous solution thereof.

The invention is illustrated by the following examples of specific laboratory scale embodiments of it. The examples were carried out in a "Vycor" high temperature resistant glass reactor 12 inches long and about 1½ inches diameter, fitted with a removable bottom made of castable refractory, through which an inlet opening permitted introduction of gas. The top of the reactor was covered with a refractory disc fitted with holes for passage of a thermocouple, two electrodes, and a gas outlet. The lower part of the reactor was charged with about 10 grams of coarse coke particles of about 1 to 3 millimeters' diameter, which acted as a gas distributor to distribute the fluidizing gas evenly under the fluidized bed. The carbon for the reaction was placed on top of the coarse coke. In these examples the carbon used was a fluid petroleum coke, produced in a fluid bed petroleum coking process, and calcined at about 900° C. for a few seconds to increase its electrical conductivity. (Without calcination, the conductivity of fluid petroleum coke is too low to permit significant resistive heating of the coke by conduction of an electric current with the application of voltage gradients as high as 1000 volts per inch.) The carbon particles were between about 0.3 and 1 millimeter diameter in size, i.e. they all passed through a screen having 16 meshes per linear inch (U.S. Standard Sieve No. 16). The carbon dioxide gas for the reaction was passed through a flow meter (rotameter) and admitted to the bottom of the reactor. Two graphite electrodes were adjustably mounted in the top of the reactor and penetrated the bed of fine carbon; the electrodes were connected through a variable transformer to a 230 volt A.C. source. A voltmeter and an ammeter, appropriately connected, enabled constant measurement of electrode voltage and current to be made. A thermocouple of platinum vs. platinum-rhodium elements was inserted in the fine carbon through the top of the reactor to measure the temperature in the fine carbon bed.

In each of the examples, the operating details and observed results of which are reported in Table I below, carbon dioxide was passed through the flowmeter and into the reactor at the desired rate indicated for each example in Table I, measured in cubic centimeters of gas per minute at atmospheric pressure and room temperature which was about 25° C. The weight in grams of fine carbon charged to the reactor for each example was measured. For some of the examples the carbon was modified by treatment as follows, before being charged to the reactor:

(1) For Example 7, the carbon was fluidized in a stream of air and maintained at a temperature of 325° C. for four hours. This treatment, which can be termed a "low temperature preoxidation," converted part of the coke to its ultimate combustion products carbon dioxide and water, and increased the surface area of the remaining coke. Complete and alternative details for carrying out this treatment by low temperature preoxidation are given in U.S.P. 2,721,169.

(2) For Example 8, the carbon particles were stirred overnight in 200 ml. of 3 normal aqueous NaOH solution, separated from the solution by filtration, then dried at 110° C. for 4 hours. This treatment impregnated the carbon with about 2–3% of its weight of NaOH.

(3) For Example 9, the carbon was preoxidized as described in treatment (1) above, then impregnated with NaOH as described in treatment (2) above. The carbon then contained about 3–4% NaOH by weight.

(4) For Example 10, the carbon was preoxidized as described in treatment (1) above, then impregnated with NaOH as described in treatment (2) above except that the NaOH solution used to impregnate the carbon was 1 normal instead of 3 normal. The carbon then contained about 2–3% NaOH by weight.

In each of the examples, the carbon dioxide gas flow was first adjusted to the desired rate, then voltage was applied across the electrodes to force a current through the bed. The voltage was adjusted to give the current value and power input which would maintain the bed at the temperature desired, as indicated for each example in Table I. In these examples the voltages used varied between 50 and 150 volts, and the currents required to maintain the desired temperatures in the bed varied between 7 and 15 amperes. When the desired temperatures had been reached in the bed and maintained for 30 minutes, samples of the gases coming from the reactor were taken and analyzed with an Orsat apparatus. The percentages of CO and $CO_2$ in the gases obtained in the various examples are shown in Table I, together with the operating details previously mentioned. The "Calculated Contact Time" is the time of contact between gas and carbon in the fluidized bed in seconds, calculated on an average of the volumes of gases passing through the bed, taking into account the following factors and assumptions:

(1) The apparent density of the carbon bed before fluidization is about 1, i.e. 40 grams of carbon in the charge occupy a volume of about 40 cc.

(2) The real density of the carbon particles is about 2.

(3) The proportion of voids in the carbon bed before fluidization, in accordance with the foregoing factors, is about 50%.

(4) The volume of the fluidized bed is about 10% greater than the volume of the bed of carbon particles before fluidization, i.e. the gas volume in the fluidized bed is about 60% of the volume of the carbon bed before fluidization.

(5) Gas flowing into the bottom of the fluidized bed is assumed to be substantially instantaneously raised to the temperature of the fluidized bed, increasing its volume substantially instantaneously in proportion to the temperature change in accordance with Gay-Lussac's law; temperature does not cause any other volume change in the gas flowing through the fluidized bed.

(6) The volume of hot gas flowing out the top of the fluidized bed is greater than the volume of hot gas flowing at the bottom of the fluidized bed by a factor directly proportional to the conversion of carbon dioxide to carbon monoxide which occurs in the bed; for example if 80% of the carbon dioxide flowing into the bed is converted to carbon monoxide in the bed, the volume of hot gas flowing out the top of the fluidized bed will be 80% greater than the volume of hot gas flowing at the bottom of the fluidized bed.

(7) The calculated contact time is an average contact time based on a volumetric rate of flow of gas in the bed which is an average of the volumetric rates of flow of hot gas at the bottom of the bed and hot gas out the top of the bed.

*Table I*

| Ex. No. | Carbon Charge (gm.) | $CO_2$ Feed (cc./min.) | Calculated Contact Time (Sec.) | Bed Temp., °C. | Product Gas Analysis | |
|---|---|---|---|---|---|---|
| | | | | | Percent CO | Percent $CO_2$ |
| 1 | 40 | 180 | 1.7 | 800 | 66.3 | 33.7 |
| 2 | 40 | 720 | 0.5 | 800 | 16.0 | 84.0 |
| 3 | 40 | 180 | 1.5 | 1,000 | 81.1 | 18.9 |
| 4 | 40 | 180 | 1.1 | 1,200 | 94.6 | 5.4 |
| 5 | 60 | 180 | 1.6 | 1,200 | 96.0 | 4.0 |
| 6 | 60 | 70 | 3.2 | 1,200 | 98.2 | 1.8 |
| 7 | 45 | 180 | 1.6 | 800 | 59.6 | 40.4 |
| 8 | 51 | 180 | 1.7 | 800 | 78.3 | 21.7 |
| 9 | 42.5 | 180 | 1.4 | 800 | 92.0 | 8.0 |
| 10 | 33 | 180 | 1.1 | 800 | 79.0 | 21.0 |

From the foregoing disclosure it can be seen that the invention provides an efficient process for the conversion of carbon dioxide into carbon monoxide, by which conversions greater than 90% can readily be achieved. The process combines numerous advantages obtained by the use of a fluidized bed with numerous advantages obtained by the use of an internally heated electrically conductive carbon bed. The preferred reaction temperature for carrying out the process is around 1200° C., and excellent results are obtained with all temperatures over 800° C. The preferred reaction time for carrying out the process provides a period of contact between reactants of about 3 seconds, and satisfactory results are obtained with contact periods above about 0.5 seconds. In preferred embodiments the process utilizes the conventional alkali catalysts for the reaction and conventional steps for treating the carbon used, prior to reaction in the process.

This application is a continuation-in-part of application Ser. No. 568,325, filed February 28, 1956.

What is claimed is:

A process for the preparation of carbon monoxide in high concentrations comprising passing a stream of carbon dioxide gas upwardly through a bed comprising finely divided electrically conductive particles of fluid petroleum coke produced in a fluid bed petroleum coking process, and calcined at about 900° C. for a few seconds to increase their electrical conductivity, said coke particles having been impregnated with a catalyst selected from the group consisting of alkali hydroxide and alkali carbonate before being fluidized with the carbon dioxide and having been treated by low temperature oxidation before being impregnated with said catalyst, maintaining the particles of the bed in a fluidized state by the passage of the said gas and the products of its reaction with the carbon upwardly therethrough, the contact time between the carbon particles and the gas passing through the bed being greater than 3 seconds and not greater than 4 seconds, passing an electric current through the resulting fluidized bed with sufficient power to maintain it at a temperature between 1000° and 1200° C., and recovering carbon monoxide coming off the fluidized bed.

References Cited in the file of this patent

UNITED STATES PATENTS

| | | |
|---|---|---|
| 1,857,799 | Winkler | May 10, 1932 |
| 2,652,319 | Sweetser et al. | Sept. 15, 1953 |

FOREIGN PATENTS

| | | |
|---|---|---|
| 582,055 | Great Britain | Nov. 4, 1946 |

OTHER REFERENCES

Haslam et al.: "Fuels and Their Combustion," 1926, pp. 152–158.